United States Patent
Huang et al.

(10) Patent No.: US 10,579,612 B2
(45) Date of Patent: Mar. 3, 2020

(54) ENFORCING UNIQUENESS OF PROPERTY-VALUE PAIRS IN A SCHEMALESS DATA STORE

(71) Applicant: Citrix Systems, Inc., Fort Lauderdale, FL (US)

(72) Inventors: Xiaodong Huang, Coral Springs, FL (US); Wenchao Li, Jiangsu Province (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 337 days.

(21) Appl. No.: 15/477,419

(22) Filed: Apr. 3, 2017

(65) Prior Publication Data

US 2018/0285409 A1 Oct. 4, 2018

(51) Int. Cl.
*G06F 16/23* (2019.01)
*G06F 16/22* (2019.01)
*G06F 16/93* (2019.01)

(52) U.S. Cl.
CPC .......... *G06F 16/2365* (2019.01); *G06F 16/22* (2019.01); *G06F 16/2379* (2019.01); *G06F 16/93* (2019.01)

(58) Field of Classification Search
CPC .......... G06F 16/22; G06F 16/23; G06F 16/93
See application file for complete search history.

(56) References Cited

U.S. PATENT DOCUMENTS

| 2003/0023559 A1 | 1/2003 | Choi et al. |
| 2009/0044283 A1 | 2/2009 | Yoshihama |
| 2015/0127658 A1* | 5/2015 | Ding .................. G06F 16/2255 707/747 |

OTHER PUBLICATIONS

David Chappell; "Introducing Document DB A NoSQL Database for Microsoft Azure"; https://github.com/wbuchwalter/azure-content/blob/master/articles/documentdb/documentdb-whitepaper-chappell.md; 13 pages.

* cited by examiner

*Primary Examiner* — Robert W Beausoliel, Jr.
(74) *Attorney, Agent, or Firm* — BrainwoodHuang

(57) ABSTRACT

A technique for enforcing uniqueness of property-value pairs in a schemaless data store includes receiving a request to uniquely store a property-value pair PV1 in a first collection of the data store. In response to receiving the request, a property-value pair PV2 is constructed that includes (a) a property on which the data store enforces uniqueness in a second collection of the data store and (b) a corresponding value that provides a formatted version of PV1. The technique includes performing a store-if-unique operation configured to (i) generate a failing result in response to PV2 already existing in the second collection and (ii) store PV2 in the second collection in response to PV2 not already existing in the second collection. If the store-if-unique operation fails, the request to store PV1 in the first collection is denied; otherwise, the request is granted.

20 Claims, 8 Drawing Sheets

ENFORCING UNIQUENESS OF PROPERTY-VALUE PAIRS IN A SCHEMALESS DATA STORE

BACKGROUND

The volume of online data has grown tremendously with the continued development of Internet sites and services. Along with this growth has come a gradual shift from the use of relational databases as a mechanism for storing data to the use of less structured, so-called noSQL data stores, which may provide advantages over relational databases in terms of scalability and access speeds. Unlike relational databases, which have well-defined "schemas," i.e., definitions of data objects and their relationships, noSQL (non-Structured Query Language) data stores require comparatively little structure and are referred to as "schemaless."

Schemaless data stores often store data in the form of key-value pairs and/or as structured data, such as JSON (JavaScript Object Notation) documents, XML (eXtensible Markup Language) documents, or other types of documents. Such documents, also referred to herein as "entities," may be provided in the form of text strings or files that conform to a defined syntax. Products for supporting schemaless data stores include, for example, Azure DocumentDB from Microsoft Corporation and Google Cloud Platform from Google in Mountain View, Calif.

Many schemaless data stores store documents (e.g., JSON documents) in "collections," i.e., groups of related documents, and store each collection in one or more "partitions," i.e., physical storage drives or sets of drives. Each document in a collection may have a document ID (identifier) and, where multiple partitions are used, a partition key. Management software in the data store may force each document ID in a collection to be unique within each partition, such that the combination of document ID and partition key uniquely identifies each document in a collection across all partitions.

SUMMARY

A need often arises in schemaless data stores for storing programmer-defined properties uniquely. For example, it may be desirable to store "user ID" uniquely in a data store for user account management, as such an arrangement would ensure that no two users can have the same user ID. Unfortunately, schemaless data stores generally provide no built-in mechanism for enforcing uniqueness in arbitrary properties.

In contrast with prior approaches, certain embodiments are directed to a method of enforcing uniqueness of property-value pairs in a schemaless data store. The method includes receiving a request to uniquely store a property-value pair PV1 in a first collection of the data store. In response to receiving the request, a property-value pair PV2 is constructed that includes (a) a property on which the data store enforces uniqueness in a second collection of the data store, such as a document ID or partition key, and (b) a corresponding value that provides a formatted version of PV1. The method further includes performing a store-if-unique operation configured to (i) generate a failing result in response to PV2 already existing in the second collection and (ii) store PV2 in the second collection in response to PV2 not already existing in the second collection. In response to the store-if-unique operation generating the failing result, the request to store PV1 in the first collection us denied. Otherwise, the request may be granted, such that PV1 is stored in the first collection and PV2 is stored in the second collection.

Other embodiments are directed to a computerized apparatus constructed and arranged to perform a method of enforcing uniqueness of property-value pairs in a schemaless data store, such as the method described above. Still other embodiments are directed to a computer program product. The computer program product stores instructions which, when executed by control circuitry, cause the control circuitry to perform a method of enforcing uniqueness of property-value pairs in a schemaless data store, such as the method described above.

The foregoing summary is presented for illustrative purposes to assist the reader in readily grasping example features presented herein; however, this summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. Such embodiments are provided by way of example to illustrate certain features and principles of the invention but that the invention hereof is not limited to the particular embodiments described.

An improved technique for enforcing uniqueness of property-value pairs in a schemaless data store leverages a built-in feature of the data store that enforces uniqueness in a system property, such as document ID and/or partition key, by extending that feature to encompass arbitrary property-value pairs. In response to a request to uniquely store a property-value pair PV1 in a first collection of the data store, the technique constructs a property-value pair PV2. The property of PV2 is one for which the data store enforces uniqueness, such as document ID or partition key, and the corresponding value of PV2 is a formatted version of PV1, which includes both the property of PV1 and the value of PV1. The technique then performs a store-if-unique operation, which attempts to store PV2 in the second collection. Owing to the fact that PV2 assigns a value to the system property, the attempt to store PV2 invokes the built-in feature of enforcing uniqueness in the system property. The store-if-unique operation thus succeeds only if PV2 does not already exist in the second collection, which, when applied consistently, means that PV1 does not exist in the first collection. If the store-if-unique operation succeeds, the technique stores PV2 in the second collection and stores PV1 in the first collection. Otherwise, the technique denies the request to store PV1, as PV1 already exists and thus cannot be stored uniquely.

Figure 1:
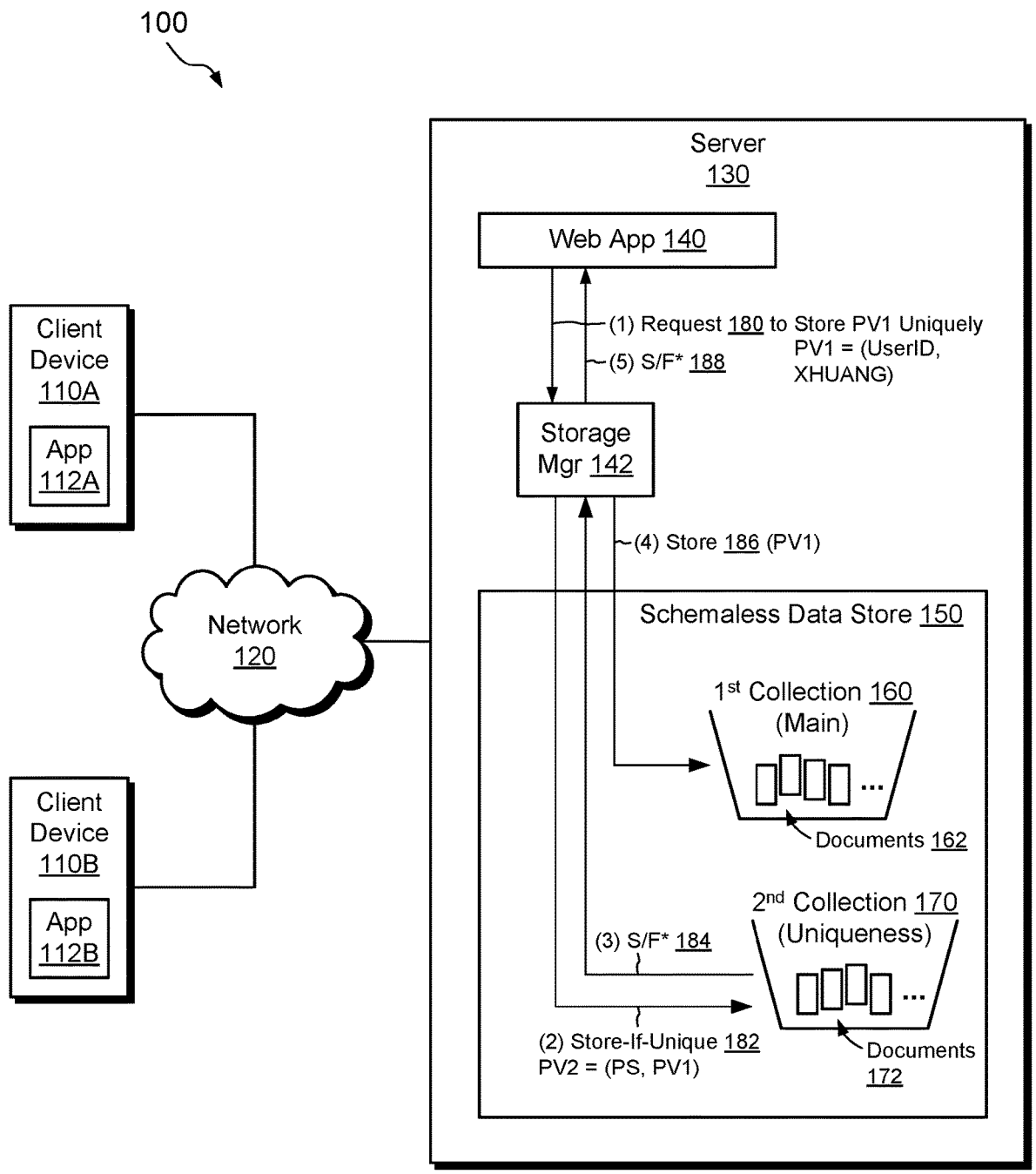
FIG. 1 is a block diagram of an example environment in which embodiments of the invention can be practiced.

FIG. 1 shows an example environment 100 in which embodiments of the improved technique hereof can be practiced. Here, client devices 110A and 110B are connected to a network 120, which is connected to a server 130. Any number of client devices may be provided. The server 130 has a web application 140 and includes a storage manager 142 and a schemaless data store 150. The schemaless data store 150 includes a first collection 160 and a second collection 170. The first collection 160, also referred to herein as a "main" collection, includes documents 162. The second collection 170, also referred to herein as a "uniqueness" collection, includes documents 172. The documents 162 and 172 may be JSON documents or other types of structured data. Each of documents 162 and each of documents 172 may be rendered as a text string, as a file, or in any other suitable manner.

In an example, each of the documents 162 and each of the documents 172 may include a system property, PS, such as document ID or partition key, for which the schemaless data store 150 enforces uniqueness. In a particular example, each document has a document ID property and a partition key property, and the schemaless data store 150 forces the combination of these properties to be unique in each collection. Thus, for example, no two documents 162 in the first collection 160 can have the same document ID and partition key. Likewise, no two documents 172 in the second collection 170 can have the same document ID and partition key. One should appreciate that the schemaless data store 150 may have no built-in mechanism to enforce uniqueness on any property other than document ID and partition key.

In example operation, client devices 110A and 110B respectively run client applications 112A and 112B to access the web application 140. For example, the client applications 112A and 112B may be web browsers or other web-enabled applications or apps, which interact with the web application 140. Interaction may include downloading data, such as web pages or other content, from the web application 140, and/or submitting data to the web application 140, e.g., using web forms or other constructs. The web application 140 receives data from client applications 112A and 112B and/or generates data in the course of its own operations. The web application 140 stores such data in the schemaless data store 150.

The numerals in parenthesis depict an example sequence of activities. At (1), the web application 140 issues a request 180 to store a property-value pair PV1 uniquely in the first collection 160. PV1 may specify any arbitrary property-value pair. For the sake of illustration, we assume that PV1 is the property-value pair (UserID, XHUANG), as shown.

Storage manager 142 receives the request 180 and proceeds to construct a property-value pair PV2. PV2 is composed of a system property PS (e.g., document ID or partition key) and a corresponding value, which provides a formatted version of PV1 (In some examples, such as those described in connection with later figures, the storage manager 142 constructs two property value pairs, one for document ID and another for partition key). Although system property values are generally established and maintained by the schemaless data store 150, the storage manager 142 may override system values by providing its own values, as is done in embodiments described herein. An illustrative example of PV2 as constructed by the storage manager 142 may be (DocID, UserID=XHUANG), where "UserID=XHUANG" is a formatted version of PV1, i.e., one in which PV1 is rendered as a text string with an equal sign delimiting the property from the value. This particular format is merely an example. For instance, other delimiters may be used, the order of property and value may be reversed, the string or portions thereof may be compressed, and so forth. All that is necessary is that the formatting of PV1 preserve information about the property of PV1 and its value, such that the formatted version of PV1 may be compared with other like-formatted property-value pairs to determine reliably whether there is a match. The storage manager 142 thus preferably applies strict rules in formatting PV2, which operate the same way for all property-value pairs.

At (2), the storage manager 142 performs a store-if-unique operation 182. For example, the storage manager 142 issues a command to store PV2 in the second collection 170. The command invokes a built-in uniqueness-checking feature in the schemaless data store 150 for ensuring uniqueness of system properties within a collection. If PV2 does not already exist in the second collection 170, the schemaless data store 150 stores PV2 in the second collection 170, e.g., in a new document 172, and returns, at (3), a result 184 that indicates success.

At (4), the storage manager 142 issues a command 186 to store PV1 in the first collection 160, thus establishing the unique value of PV1. This act is performed in response to the store-if-unique operation 182 succeeding and is not preformed if the store-if-unique operation 182 fails.

At (5), the storage manager 142 returns a successful result 188 to the web application 140, indicating that PV1 was successfully (and uniquely) stored in the first collection 160.

Returning to (2), if PV2 does already exist in the second collection 170, such that storing PV1 would violate the requirement for uniqueness, the schemaless data store 150 returns a result 184 at (3) that indicates a failure. The storage manager 142 may then return, at (5), a failing result to the web application 140, indicating that PV1 was not stored in the first collection 160.

By storing formatted property-value pairs of the first collection 160 as values of a system property of a property-value pair in the second collection 170, the built-in machinery for ensuring uniqueness in the system property can be extended and leveraged for use with any property, as long as the second collection 170 is checked before adding any property-value pair to the first collection 160. Thus, the illustrated technique can enforce uniqueness for arbitrary property-value pairs, overcoming a limitation inherent in many schemaless data stores.

The illustrated technique is also fast. Without the benefit of this technique, programmers might have no option for ensuring uniqueness other than to search each document 162 in the first collection 160 for matching property-value pairs. As documents 162 may number in the millions, searching the documents 162 would consume valuable computing and storage resources, as well as network resources in distributed systems. In contrast with this cumbersome and resource-intensive approach, the illustrated technique enforces uniqueness of arbitrary properties efficiently by leveraging the built-in and highly-efficient enforcement of uniqueness for the system property.

Figure 2:
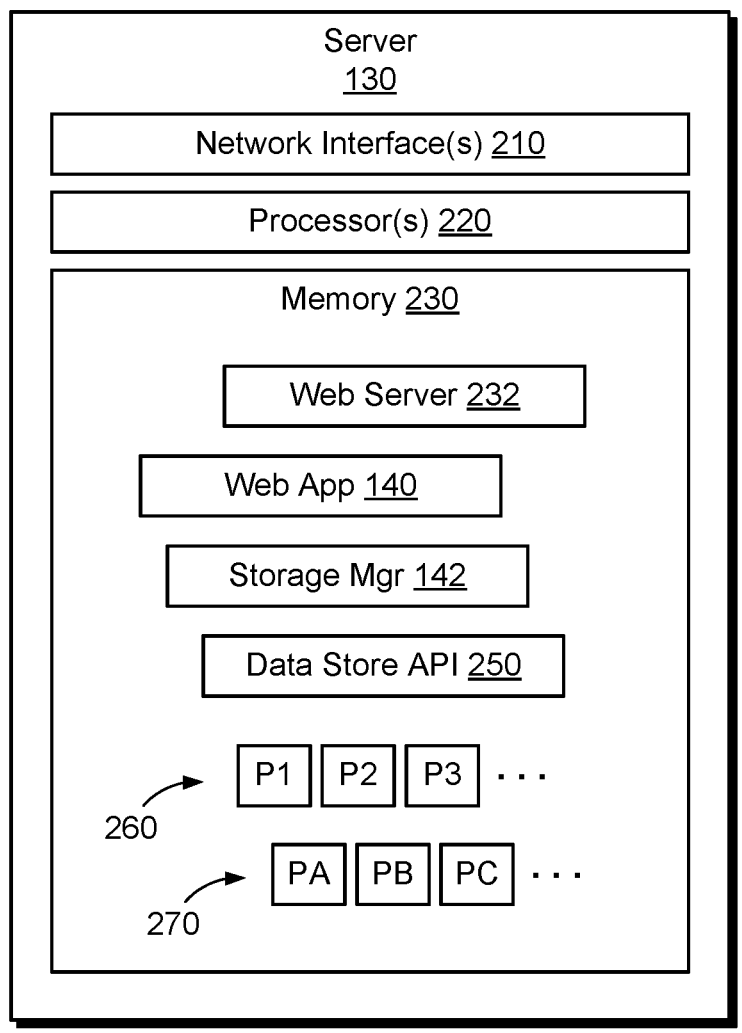
FIG. 2 is a block diagram of an example server of FIG. 1.

FIG. 2 shows example aspects of the server 130 in additional detail. As shown, the server 130 includes one or more network interfaces 210, a set of processors 220, and memory 330. The set of processors 220 includes one or more processing chips and/or assemblies. The memory 230 includes both volatile memory, such as RAM (Random Access Memory), and non-volatile memory, such as one or more ROMs (Read-Only Memories), disk drives, solid state drives, and the like. The set of processors 220 and the memory 230 together form control circuitry, which is constructed and arranged to carry out various methods and functions as described herein. Also, the memory 230 includes a variety of software constructs realized in the form of executable instructions. When the executable instructions are run by the set of processors 220, the set of processors 220 are caused to carry out the operations of the software constructs. Although certain software constructs are specifically shown and described, it is understood that the memory 230 typically includes many other software constructs, which are not shown, such as an operating system, various applications, processes, and daemons.

The memory 230 is seen to "include," i.e., realize by execution of software instructions, a web server 232, as well as the above-described web application 140 and storage manager 142. The web server 232 provides a communications interface between the web application 140 and client applications 112A and 112B. The memory 230 may further include a data store API 250, for communicating with the schemaless data store 150. The memory 230 may still further include partitions 260 (e.g., P1, P2, P3, . . . ), which provide storage resources in which the first collection 260 is deployed, as well as partitions 270 (e.g., PA, PB, PC, . . . ), which provide storage resources in which the second collection 270 is deployed. In an example, each of partitions 260 and each of partitions 270 provides a respective storage drive (e.g., flash drive) or set of such drives and is associated with a unique partition key.

One should appreciate that the server 130 may be implemented using a single computerized apparatus (as shown) or using any number of computerized apparatuses that work together in a cooperative fashion. For example, the server 130 may be implemented on different computing nodes in respective locations. The partitions 260 and 270 may be local to a single node or distributed. In addition, any of the web server 232, web application 140, storage manager 142, and data store API 250 may be realized in one or more physical (bare metal) machines, in one or more virtual machines, or in any combination of physical and virtual machines.

Figure 3A:
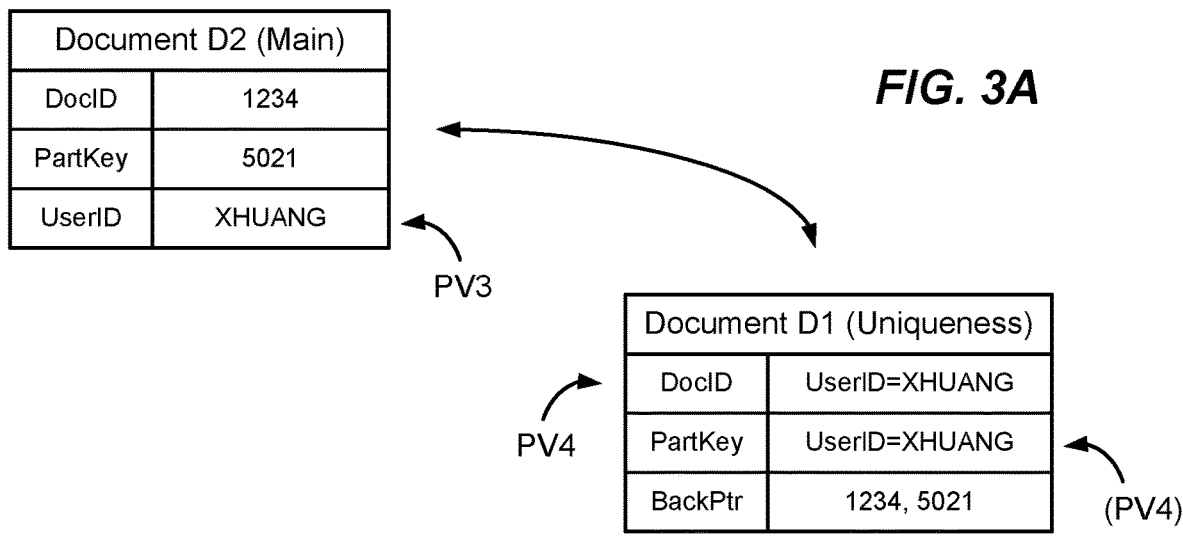
FIGS. 3A and 3B are respectively a block diagram and an accompanying flow chart that show an example arrangement for uniquely storing a property-value pair in a document of a data store.
Figure 3B:
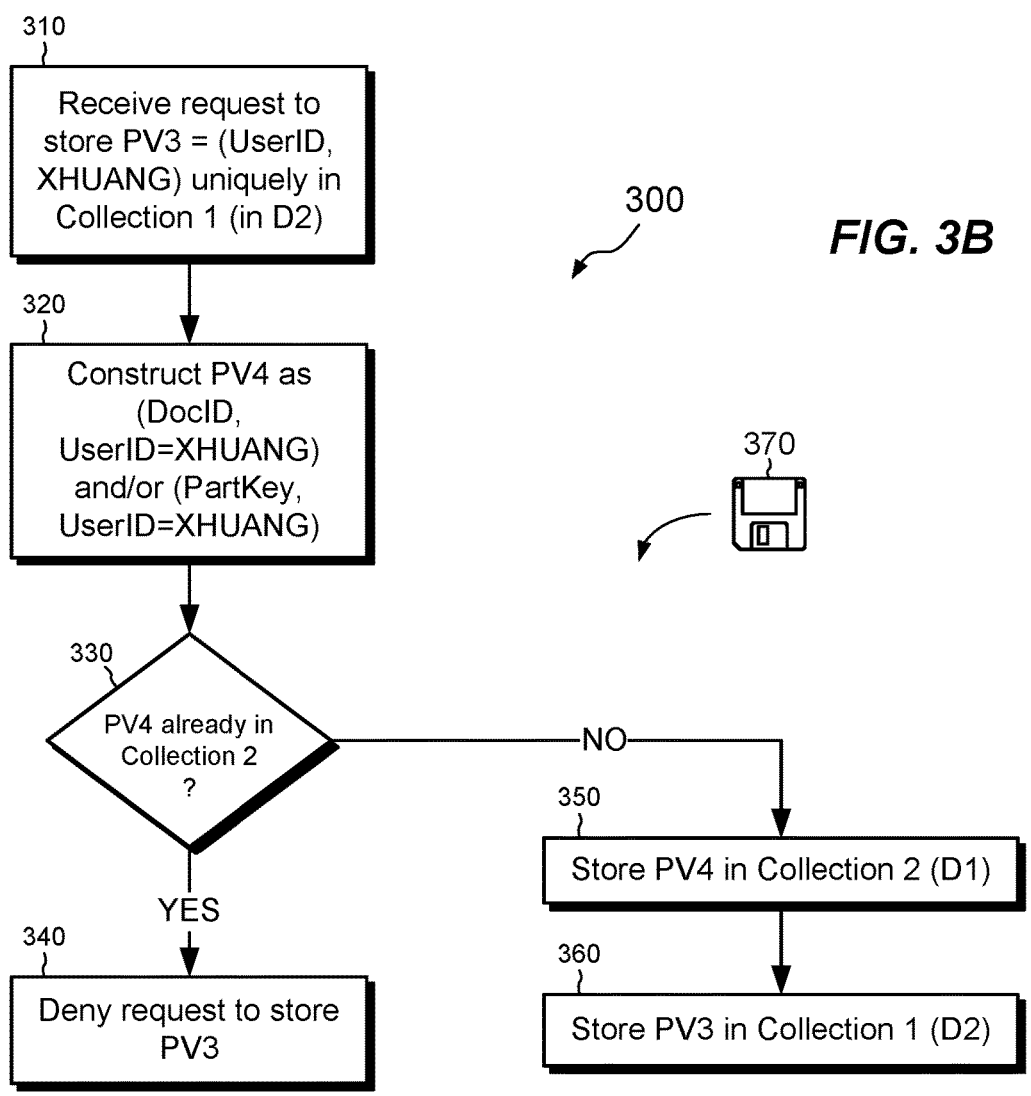

FIGS. 3A and 3B show an example arrangement for responding to a request to uniquely store a property-value pair PV3 in the first collection 160. FIG. 3A shows example data structures that may be created using the method of FIG. 3B. The acts of FIG. 3B may be performed, for example, by the storage manager 142 running in the server 130, and provide another example of the acts described above in connection with FIG. 1.

At 310, a request is received to uniquely store a property-value pair PV3, which has the value (UserID, XHUANG). The request to store PV3 may be part of a request to create a new document 162 in the first collection 160, such as document D2 (see FIG. 3A). Here, property "UserID" is not a system property on which the schemaless data store 150 inherently enforces uniqueness, such that other measure must be employed if values of UserID are to be maintained uniquely.

At 320, the storage manager 142 constructs a property-value pair PV4. The property component of PV4 in this example is "DocID," i.e., a system document ID property on which the schemaless data store 150 enforces uniqueness. The value component of PV4 is a formatted version of PV3, such as "UserID=XHUANG." The construction of PV4 may be carried out by the set of processors 220 executing instructions in the memory 230, e.g., in software. Also, the construction of PV4 may accompany construction of a document 172 in the second collection 170, such as document D1 (FIG. 3A), which includes PV4.

At 330, a store-if-unique operation 182 (FIG. 1) is initiated, e.g., by testing whether PV4 already exists in the second collection 170. For example, operation 330 may check whether any document 172 in the second collection 170 already stores PV4. One should appreciate that the operation 330 may be performed implicitly as part of the store-if-unique operation 182, e.g., using an efficient mechanism built in to the schemaless data store 150.

If PV4 is already stored in the second collection 170, operation proceeds to 340, whereupon the request to store PV3 is denied and the method completes without storing D1 or D2.

If PV4 does not already exist, operation proceeds to 350, where the storage manager 142 stores PV4 in the second collection 170, e.g., in document D1, thus completing the store-if-unique operation 182. At 360, the storage manager 142 stores PV3 in the first collection 160, e.g., in document D2.

FIG. 3A shows the created documents D1 and D2 in additional detail. Here, document D2, which resides in the first (main) collection 160, has a document ID (DocID) of "1234" and a partition key (PartKey) of "5021." Document D1 also stores a UserID of "XHUANG" (as PV3).

To support uniqueness of PV3, document D1, which resides in the second (uniqueness) collection 170, stores PV4 using the DocID property field, i.e., by storing a formatted value of PV3 as the value of DocID. Recall that the schemaless data store 150 enforces uniqueness in the second collection 170 based on the combination of DocID and PartKey. Thus, with DocID set to PV3 in document D1, PartKey may be set to literally any value, provided PartKey is set to the same value throughout the entire second collection 170. In this manner, the schemaless data store 150 can enforce uniqueness of PV3 based on DocID alone, with PartKey remaining invariant.

Although holding PartKey constant might work well in single-partition systems, it has the disadvantage of assigning all documents in the second collection 170 to the same partition, potentially causing a hot spot and poor load balancing. Another possibility would be to set PartKey to PV3 and to maintain DocID as a constant. This too leads to operational difficulties, however, as the second collection 170 would be limited to a single document. Preferably, the storage manager 142 sets both DocID and PartKey in D1 to PV3 (as shown), as doing so allows there to be a unique document for each property-value pair in the second collection 170, while it also promotes load balancing among partitions 270 (FIG. 2).

Document D1 is further seen to include a back pointer property (BackPtr), which in this case equals "1234, 5021" to respectively match the document ID and partition key of D2. This arrangement enables the storage manager 142 to identify the document in the first collection 160 (D2) that stores the property-value pair for which the current document (D1) enforces uniqueness.

One should appreciate that the depictions of documents D1 and D2 are intended to be schematic rather than limiting and that the specific forms of these documents may vary based on implementation.

Figure 4A:
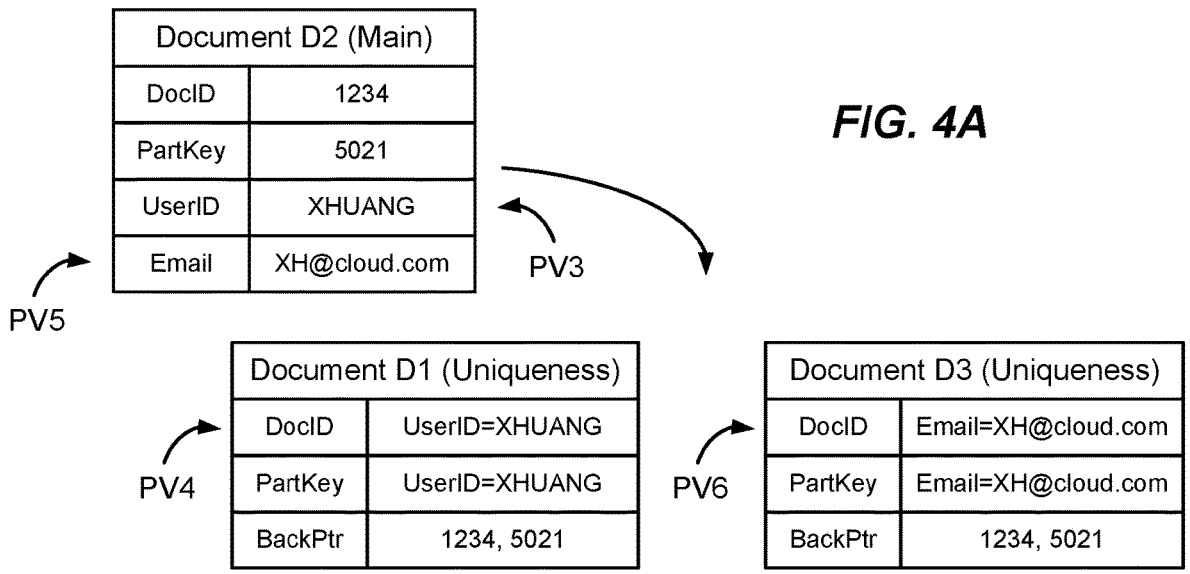
FIGS. 4A and 4B are respectively a block diagram and an accompanying flow chart that show an example arrangement for uniquely and atomically storing multiple property-value pairs in the document of the data store.
Figure 4B:
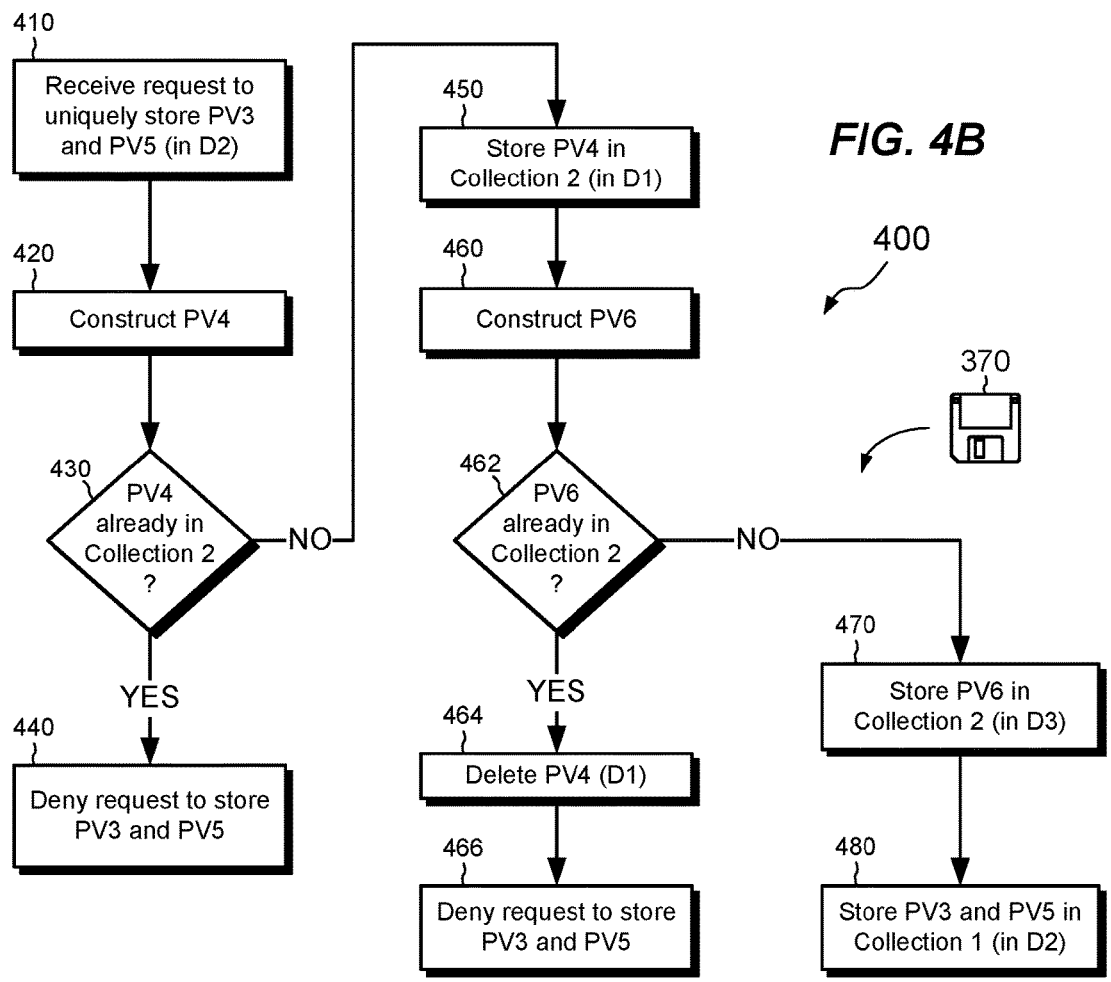

FIGS. 4A and 4B show a more complex example of the arrangement of FIGS. 3A and 3B. The activities described in connection with FIGS. 4A and 4B are presented as an alternative to those shown in FIGS. 3A and 3B and assume that documents D1 and D2 have not already been created.

At 410, the request to uniquely store PV3 is accompanied by a request to also uniquely store property-value pair PV5. PV3 is the same as in FIG. 3A, but PV5 is a different property-value pair, e.g., one for storing an email address. The request at 410 is a request to create document D2, where both UserID and Email are required to be unique. The method of FIG. 4B proceeds atomically, such that either D2 is created with unique properties for both UserID and Email, or D2 is not created at all.

At 420, the storage manager 142 constructs PV4, e.g., in the same manner as in step 320 of FIG. 3B.

At 430, the storage manager 142 tests whether PV4 already exists in the second collection 170. If so, operation proceeds to 440, where the request (from 410) is denied, with no documents being created.

If PV4 does not already exist in the second collection 170 (at test 430), however, operation proceeds to 450, where the storage manager 142 stores PV4 in document D1 of the second collection 170.

At 460, the storage manager 142 constructs PV6, with property "DocID" and corresponding value "Email=XH@cloud.com." Test 462 then checks whether PV6 is already stored in the second collection 170. If so, document D1 is deleted (at 464) and the request to store PV3 and PV5 in document D2 is denied (step 466).

If PV6 does not already exist in the second collection 170 (at test 462), however, operation proceeds to 470, where the storage manager 142 stores PV6 in document D3 of the second collection 170. Storage manager 142 also stores PV3 and PV5 in document D2 (at 480).

Storage manager 142 thus creates a different document in the second collection 170 for each property-value pair for which uniqueness is to be enforced in the first collection 160. For example, if D2 included ten unique property-value pairs, the storage manager 142 would create ten documents in the second collection 170, one document for each unique property-value pair in D2. Thus, there may be many more documents 172 in the second collection 170 than there are documents 162 in the first collection 160. Documents 172 tend to be small, however, such that their large number can be easily managed.

One should appreciate that not all property-value pairs in documents 162 in the first collection 160 are required to be unique. For example, document D2, which might store information about a particular user, might also store a property for "city" or "state" (not shown), which would not be stored uniquely. For example, other documents in the first collection 160 representing other users might have the same value for city or state. Such non-unique property-value pairs require no corresponding document to be stored in the second collection 160, as uniqueness of those pairs is not enforced.

It is thus evident that the uniqueness enforced herein applies to property-value pairs, not to properties on their own. For example, if one hundred documents in the first collection 160 each have a property value for UserID, one hundred documents would be required in the second collection 170 to enforce uniqueness, i.e., one document for each UserID-value pair.

Figure 5A:
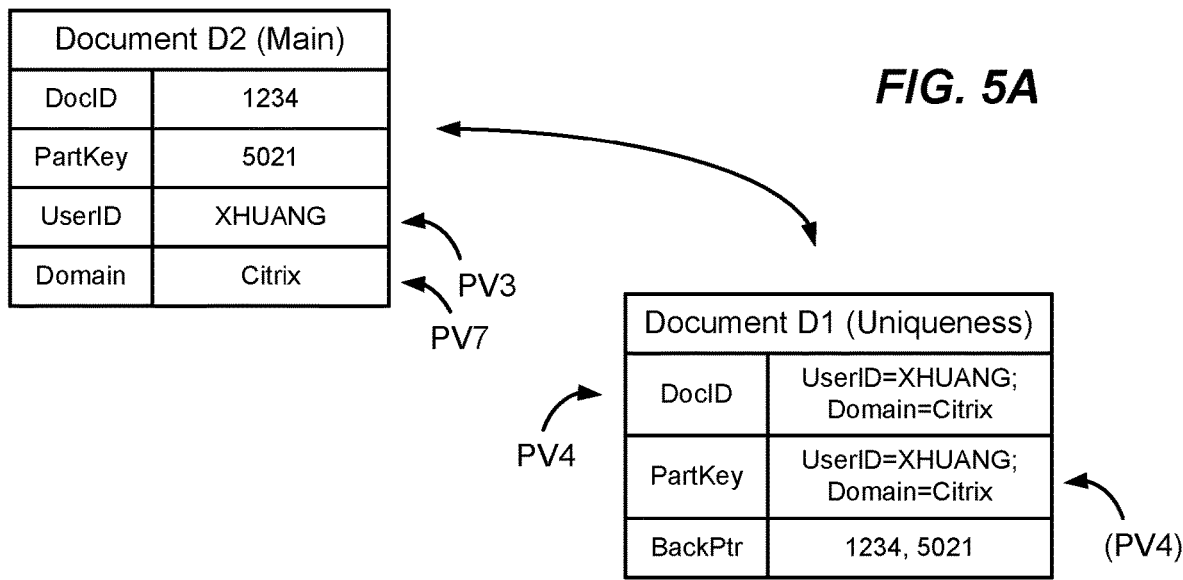
FIGS. 5A and 5B are respectively a block diagram and an accompanying flow chart that show an example arrangement for storing a unique combination of multiple property-value pairs in the document of the data store.
Figure 5B:
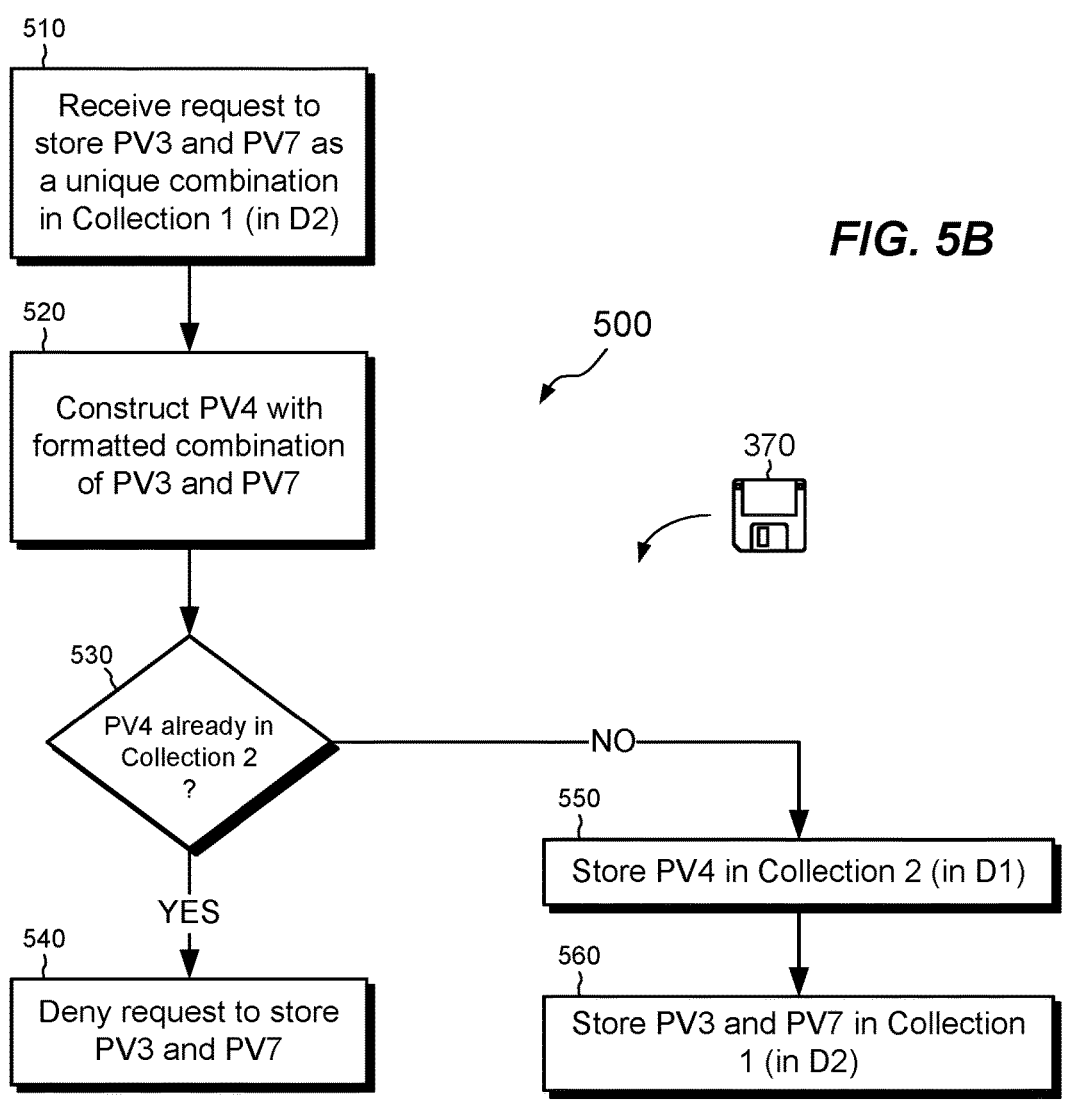

FIGS. 5A and 5B show another example based on the arrangement of FIGS. 3A and 3B. Here, however, uniqueness is to be enforced on a combination of property-value pairs, rather than on a single property-value pair, as in FIGS. 3A and 3B, and rather than on multiple property-value pairs individually, as in FIGS. 4A and 4B. This example again assumes that documents D1 and D2 have not yet been created.

At 510, a request is received to store PV3 and PV7 (another property-value pair) as a unique combination in the first collection 160, regardless of whether PV3 and PV7 are individually unique.

At 520, the storage manager 142 constructs PV4 with a formatted combination of PV3 and PV7. In the example shown, PV3 may be formatted as "UserID=XHUANG" and PV7 may be formatted as "Domain=Citrix." Their combination, as shown in FIG. 5A (in document D1), may thus be expressed as follows:

"UserID=XHUANG;Domain=Citrix,"

where the semicolon provides a delimiter between property-value pairs. Other delimiters may be used, and other formatting techniques may be applied, as long as information is preserved and formatting is done consistently.

Test 530 checks whether PV4 is already found in the second collection 170. If so, the request at 510 is denied (at 540) and no new documents are stored. If not, operation proceeds to 550, where the storage manager 142 stores PV4 in document D1 of the second collection 170. At 560, the storage manager 142 also stores both PV3 and PV7 in document D2 of the first collection 160.

Using the principles described in connection with FIGS. 5A and 5B, uniqueness can be enforced based on combinations of any number of property-value pairs, e.g., by adding more string content to the value of PV4 in D1 to reflect additional property-value pairs in D2.

Figures 6A, 6B:
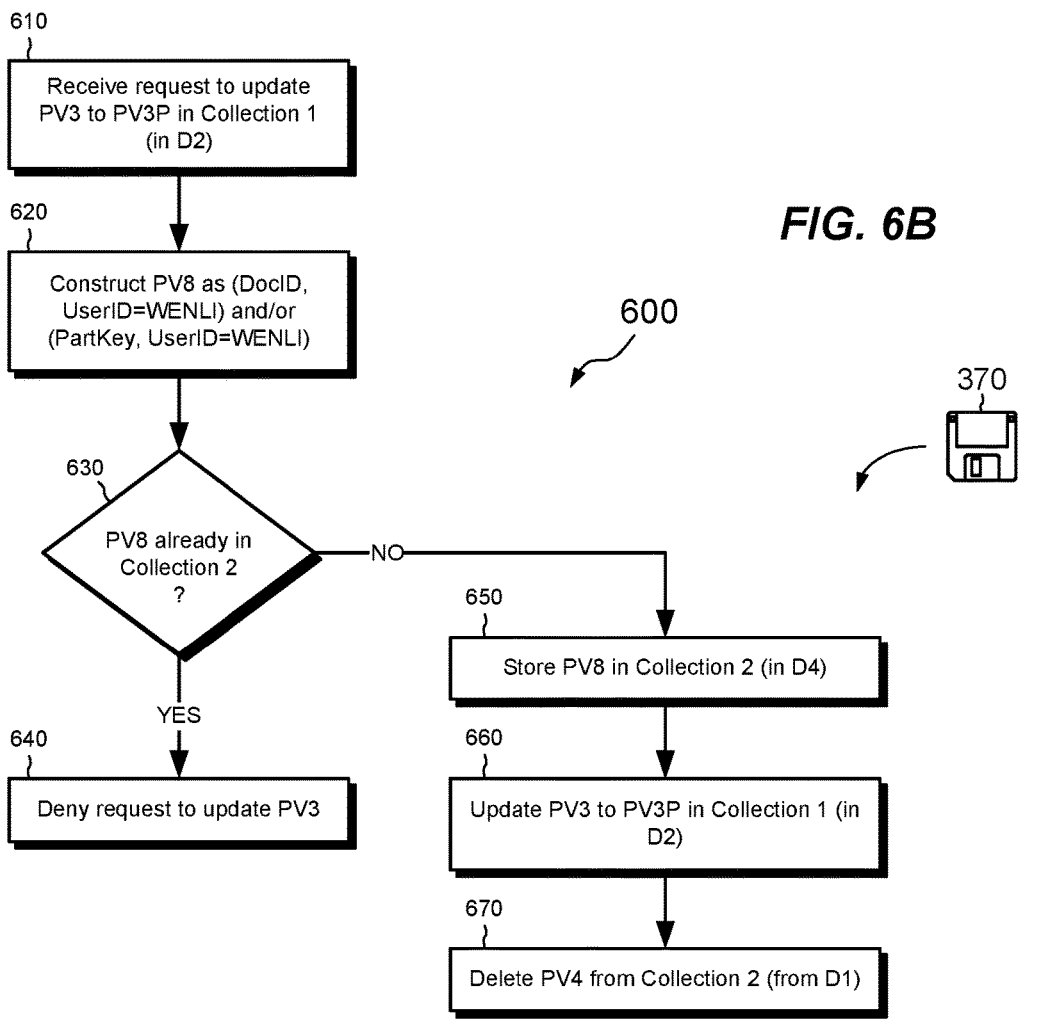
FIGS. 6A and 6B are respectively a block diagram and an accompanying flow chart that show an example arrangement for updating a value of a property-value pair in the document of the data store, while ensuring uniqueness of the updated value.

FIGS. 6A and 6B show yet another example based on FIGS. 3A and 3B, except that here the request is to update an existing property-value pair, rather than to create a new one. For purposes of this example, it is assumed that the activities depicted in FIGS. 3A and 3B have already taken place, and that D1 and D2 have already been created.

At 610, the storage manager 142 receives a request to update the value of PV3 in document D2, such that PV3 is to become PV3P. For example, the request at 610 may seek to change UserID in document D2 from "XHUANG" to "WENLI."

At 620, the storage manager 142 constructs a property-value pair PV8, e.g., as (DocID, UserID=WENLI).

At 630, the storage manager 142 tests whether PV8 is already stored in the second collection 170. If so, the request at 610 to update PV3 is denied (at 640), and no changes are made. If not, operation proceeds to 650, where the storage manager 142 creates a new document D4 and stores PV8 in D4.

At 660, the storage manager 142 updates PV3 in document D2 to PV3P, thus effecting the desired update.

At 670, the storage manager 142 deletes document D1, thus deleting PV4, which is now obsolete. Such deletion allows the previous value of UserID, "XHUANG," to become available for use by others. It is thus evident that updating a unique property-value pair in the first collection 160 causes one document to be deleted from the second collection 170 and another document to be created.

Figure 7A:
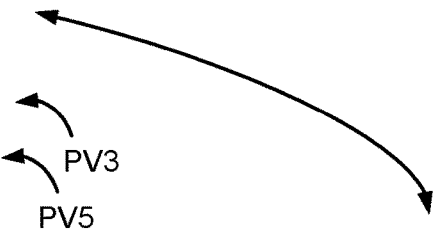
FIGS. 7A and 7B are respectively a block diagram and an accompanying flow chart that show an example arrangement for deleting a unique property-value pair from the document of the data store.
Figure 7B:
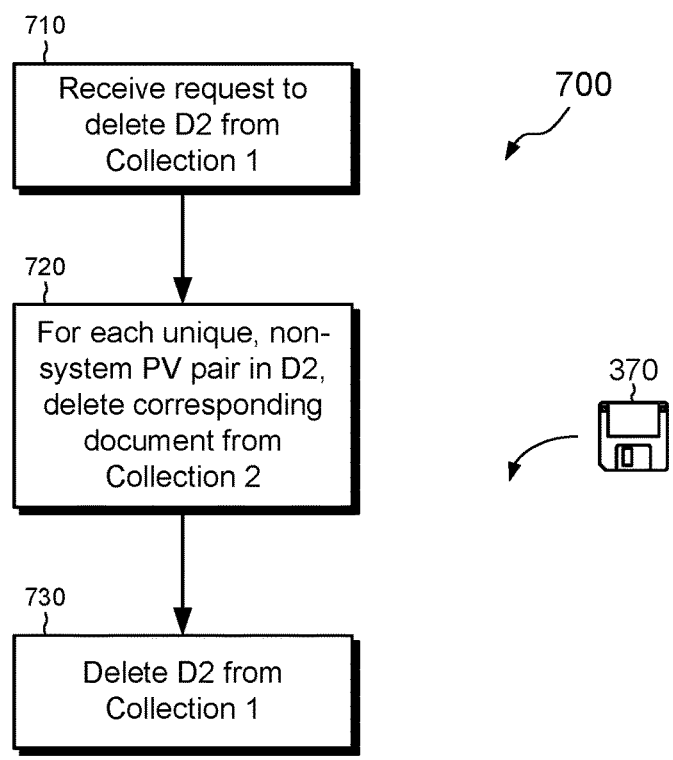

FIGS. 7A and 7B show an example based on FIGS. 4A and 4B. Here, the request is to delete a document from the first collection 160. It is assumed for this example that the activities shown in FIGS. 4A and 4B have already taken place, and that D1, D2, and D3 have already been created.

At 710, the storage manager 142 receives a request to delete document D2 from the first collection 160.

At 720, the storage manager 142 iterates over all non-system property-value pairs in D2, deleting the corresponding document from the second collection 170. For example, the storage manager 142 takes each non-system document-value pair in D2 and creates therefrom a system document-value pair, i.e., a document pair whose property is a system property and whose value is a property-value pair. The storage manager then performs a lookup on the created system document-value pair in the second collection 170. If the system document-value pair is found, the storage manager 142 deletes the document that contains it. This process is repeated for each non-system document-value pair in D2. In this fashion, the storage manager 142 deletes document D1 after finding system document-value pair (DocID, UserID=XHUANG) and deletes document D3 after finding system document-value pair (DocID, Email=XH@cloud.com).

At 730, once all non-system document value pairs in D2 are exhausted, the storage manager 142 deletes document D2 from the first collection 160. Deletion of document D2 in the first collection 160 thus entails deletion of all documents in the second collection 170 that enforce unique property-value pairs of D2.

In each of these methods, labeled above as 300, 400, 500, 600 and 700, the orders of the respective acts are merely examples, as many acts can be performed in different orders or simultaneously. The depicted orders of acts are therefore not intended to be limiting.

Figure 8:
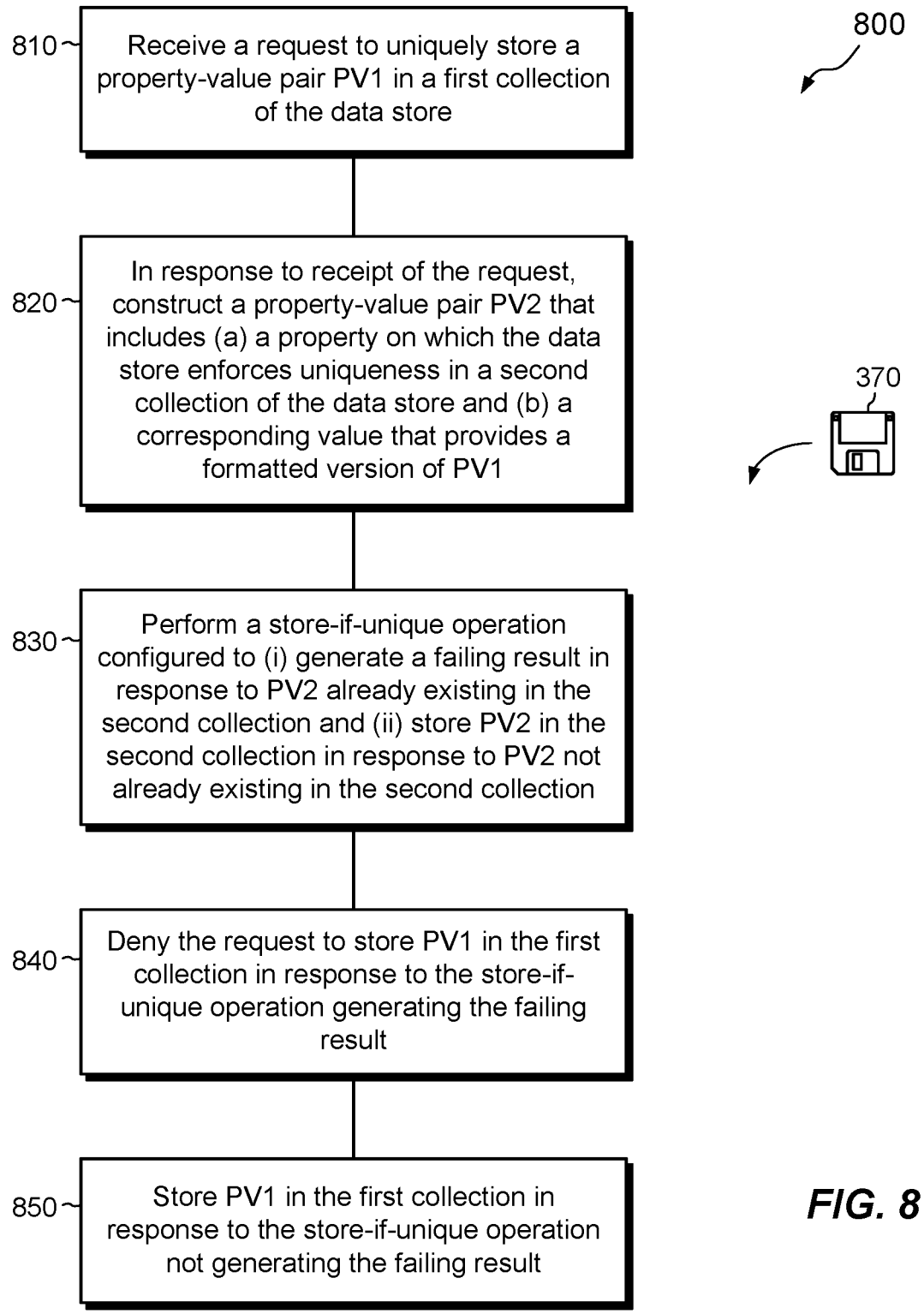
FIG. 8 is a flowchart showing an example method of enforcing uniqueness of property-value pairs in a schemaless data store.

FIG. 8 shows an example method 800 that may be carried out in connection with the environment 100. The method 800 is typically performed, for example, by the software constructs described in connection with FIG. 2, which reside in the memory 230 of the server 130 and are run by the set of processors 220. The various acts of the method 800 may be ordered in any suitable way. Accordingly, embodiments may be constructed in which acts are performed in orders different from that illustrated, which may include performing some acts simultaneously.

At 810, a request 180 is received to uniquely store a property-value pair PV1 in a first collection 160 of a data store 150.

At 820, in response to receipt of the request 180, a property-value pair PV2 is constructed. PV2 includes (a) a property on which the data store enforces uniqueness in a second collection 170 of the data store 150 (e.g., PS, such as document ID or partition key), and (b) a corresponding value that provides a formatted version of PV1.

At 830, a store-if-unique operation 182 is performed. The store-if-unique operation 182 is configured to (i) generate a failing result in response to PV2 already existing in the second collection 170 and (ii) store PV2 in the second collection 170 in response to PV2 not already existing in the second collection 170.

At 840, the request to store PV1 in the first collection 160 is denied in response to the store-if-unique operation 182 generating the failing result.

Alternatively, at 850, PV1 is stored in the first collection 160 in response to the store-if-unique operation 182 not generating the failing result.

An improved technique has been described for enforcing uniqueness of property-value pairs in a schemaless data store 150. The technique leverages a feature of the data store 150 that enforces uniqueness in a system property PS, such as document ID and/or partition key, by extending that feature to encompass arbitrary property-value pairs.

Having described certain embodiments, numerous alternative embodiments or variations can be made. For example, although embodiments have been described in which the schemaless data store 150 has a built-in feature for enforcing uniqueness based on a combination of document ID and partition key, this is merely an example. Alternatively, the schemaless data store 150 may enforce uniqueness based on a single property, such as document ID, or based on a combination of any number of properties.

Also, emphasis has been place on the above-described build-in feature of the schemaless data store 150 for efficiently enforcing uniqueness of system properties, on account of the advantages it confers. However, the invention hereof is not limited to schemaless data stores that include this built-in feature. For example, embodiments may be constructed that enforce uniqueness of certain properties using features that are neither built-in nor highly optimized. Such embodiments may nevertheless confer operational benefits.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 370 in FIGS. 3B, 4B, 5B, 6B, and 7B). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of enforcing uniqueness of property-value pairs in a schemaless data store, the method comprising:
    receiving a request to uniquely store a property-value pair PV1 in a first collection of the data store;
    in response to receiving the request, constructing a property-value pair PV2 that includes (a) a property on which the data store enforces uniqueness in a second collection of the data store and (b) a corresponding value that provides a formatted version of PV1;
    performing a store-if-unique operation configured to (i) generate a failing result in response to PV2 already existing in the second collection and (ii) store PV2 in the second collection in response to PV2 not already existing in the second collection; and
    in response to the store-if-unique operation generating the failing result, denying the request to store PV1 in the first collection.

2. The method of claim 1, further comprising:
    receiving a request to store a property-value pair PV3 in the first collection of the data store;
    storing a property-value pair PV4 in the second collection of the data store, PV4 including (a) the property on which the data store enforces uniqueness in the second collection and (b) a corresponding value that provides a formatted version of PV3; and
    storing PV3 in the first collection,
    wherein storing PV4 in the second collection is responsive to PV4 not already existing in the second collection.

3. The method of claim 2, wherein storing PV4 in the second collection is performed by creating a document D1 in the second collection and storing PV4 in D1.

4. The method of claim 3, wherein storing PV3 in the first collection is performed by creating a document D2 in the first collection and storing PV3 in D2.

5. The method of claim 4, further comprising storing a property-value pair in D1 in the second collection that identifies D2 in the first collection.

6. The method of claim 4, wherein the request to store PV3 in the first collection accompanies a request to store a property-value pair PV5 in document D2 along with PV3, and wherein the method further comprises:
    storing a property-value pair PV6 in a document D3 in the second collection, PV6 including (a) the property on which the data store enforces uniqueness in the second collection and (b) a corresponding value that provides a formatted version of PV5; and
    storing PV5 in the document D2 in first collection,
    wherein storing PV6 in the document D3 in the second collection is responsive to PV6 not already existing in the second collection.

7. The method of claim 6, wherein creating the document D2 with property-value pairs PV3 and PV5 is performed atomically, such that creation of D2 in the first collection is contingent upon neither PV4 nor PV6 already existing in the second collection.

8. The method of claim 4,
    wherein the request to store PV3 in the first collection (i) accompanies a request to store a property-value pair PV7 in document D2 along with PV3 and (ii) specifies that a combination of PV3 and PV7 must be unique in the first collection regardless of whether PV3 and PV7 are individually unique in the first collection, and
    wherein storing the property-value pair PV4 in the second collection includes storing a value that provides a formatted version of PV7 along with the formatted version of PV3.

9. The method of claim 4, further comprising:
    receiving an update request to change a value of the property-value pair PV3 in document D2, such that PV3 would become PV3P;
    in response to the update request, constructing a property-value pair PV8, PV8 including (a) the property on which the data store enforces uniqueness in the second collection and (b) a corresponding value that provides a formatted version of PV3P;
    after confirming that PV8 does not already exist in the second collection, creating, in the second collection, a new document D4 that includes PV8;
    updating document D2 to store PV3P in place of PV3; and
    deleting document D1 from the second collection.

10. The method of claim 4, further comprising:
    receiving a delete request to delete document D2 from the first collection; and
    in response to the delete request, (i) deleting D2 from the first collection and (ii) deleting D1 from the second collection, thereby freeing PV3 for later use.

11. A computerized apparatus for implementing a schemaless data store, the apparatus comprising a set of processors coupled to memory, the memory storing instructions which, when executed by the set of processors, cause the set of processors to:
    receive a request to uniquely store a property-value pair PV1 in a first collection of the data store;
    in response to receipt of the request, construct a property-value pair PV2 that includes (a) a property on which the data store enforces uniqueness in a second collection of the data store and (b) a corresponding value that provides a formatted version of PV1;
    perform a store-if-unique operation configured to (i) generate a failing result in response to PV2 already existing in the second collection and (ii) store PV2 in the second collection in response to PV2 not already existing in the second collection;
    deny the request to store PV1 in the first collection in response to the store-if-unique operation generating the failing result; and
    store PV1 in the first collection in response to the store-if-unique operation not generating the failing result.

12. A computer program product including a set of non-transitory, computer-readable media having instructions which, when executed by control circuitry of a computerized apparatus, cause the control circuitry to perform a method for enforcing uniqueness of property-value pairs in a schemaless data store, the method comprising:

receiving a request to uniquely store a property-value pair PV1 in a first collection of the data store;

in response to receiving the request, constructing a property-value pair PV2 that includes (a) a property on which the data store enforces uniqueness in a second collection of the data store and (b) a corresponding value that provides a formatted version of PV1;

performing a store-if-unique operation configured to (i) generate a failing result in response to PV2 already existing in the second collection and (ii) store PV2 in the second collection in response to PV2 not already existing in the second collection; and in response to the store-if-unique operation generating the failing result, denying the request to store PV1 in the first collection.

13. The computer program product of claim 12, wherein the method further comprises:

receiving a request to store a property-value pair PV3 in the first collection of the data store;

storing a property-value pair PV4 in the second collection of the data store, PV4 including (a) the property on which the data store enforces uniqueness in the second collection and (b) a corresponding value that provides a formatted version of PV3; and storing PV3 in the first collection, wherein storing PV4 in the second collection is responsive to PV4 not already existing in the second collection.

14. The computer program product of claim 13, wherein storing PV4 in the second collection is performed by creating a document D1 in the second collection and storing PV4 in D1, and wherein storing PV3 in the first collection is performed by creating a document D2 in the first collection and storing PV3 in D2.

15. The computer program product of claim 14, wherein the method further comprising storing a property-value pair in D1 in the second collection that identifies D2 in the first collection.

16. The computer program product of claim 14, wherein the request to store PV3 in the first collection accompanies a request to store a property-value pair PV5 in document D2 along with PV3, and wherein the method further comprises:

storing a property-value pair PV6 in a document D3 in the second collection, PV6 including (a) the property on which the data store enforces uniqueness in the second collection and (b) a corresponding value that provides a formatted version of PV5; and storing PV5 in the document D2 in first collection, wherein storing PV6 in the document D3 in the second collection is responsive to PV6 not already existing in the second collection.

17. The computer program product of claim 16, wherein creating the document D2 with property-value pairs PV3 and PV5 is performed atomically, such that creation of D2 in the first collection is contingent upon neither PV4 nor PV6 already existing in the second collection.

18. The computer program product of claim 14, wherein the request to store PV3 in the first collection (i) accompanies a request to store a property-value pair PV7 in document D2 along with PV3 and (ii) specifies that a combination of PV3 and PV7 must be unique in the first collection regardless of whether PV3 and PV7 are individually unique in the first collection, and wherein storing the property-value pair PV4 in the second collection includes storing a value that provides a formatted version of PV7 along with the formatted version of PV3.

19. The computer program product of claim 14, wherein the method further comprises:

receiving an update request to change a value of the property-value pair PV3 in document D2, such that PV3 would become PV3P;

in response to the update request, constructing a property-value pair PV8, PV8 including (a) the property on which the data store enforces uniqueness in the second collection and (b) a corresponding value that provides a formatted version of PV3P;

after confirming that PV8 does not already exist in the second collection, creating, in the second collection, a new document D4 that includes PV8;

updating document D2 to store PV3P in place of PV3; and deleting document D1 from the second collection.

20. The computer program product of claim 14, further wherein the method further comprises:

receiving a delete request to delete document D2 from the first collection; and in response to the delete request, (i) deleting D2 from the first collection and (ii) deleting D1 from the second collection, thereby freeing PV3 for later use.

* * * * *